Aug. 18, 1964  P. F. BURTON ETAL  3,144,965
ICE STORAGE AND DISPENSING HOPPER
Filed Dec. 28, 1961  3 Sheets-Sheet 1

INVENTORS
Paul F. Burton
Paul F. Fleagle
Roy S. Steeley
BY Bacon & Thomas ATTORNEYS Aug. 18, 1964　　　P. F. BURTON ETAL　　　3,144,965
ICE STORAGE AND DISPENSING HOPPER
Filed Dec. 28, 1961　　　　　　　　　　　　3 Sheets-Sheet 2

FROM ICE MAKER

INVENTORS
Paul F. Burton
Paul F. Fleagle
Roy S. Steeley
BY
Bacon & Thomas
ATTORNEYS Aug. 18, 1964   P. F. BURTON ETAL   3,144,965
ICE STORAGE AND DISPENSING HOPPER
Filed Dec. 28, 1961   3 Sheets-Sheet 3

INVENTORS
Paul F. Burton
Paul F. Fleagle
Roy S. Steeley
BY Bacon & Thomas
ATTORNEYS

United States Patent Office 3,144,965
Patented Aug. 18, 1964

3,144,965
ICE STORAGE AND DISPENSING HOPPER
Paul F. Burton, Paul F. Fleagle, and Roy S. Steeley, Charles Town, W. Va., assignors to Dixie-Narco, Inc., Ranson, W. Va., a corporation of West Virginia
Filed Dec. 28, 1961, Ser. No. 162,806
4 Claims. (Cl. 222—108)

This invention relates to an ice storage and dispensing device and particularly to a device for dispensing measured quantities of crushed ice. The device is intended particularly for use with machines which dispense beverages in measured quantities, in cups or the like, and wherein it is desired to deposit a quantity of crushed ice in the beverage as it is dispensed.

In general, the apparatus comprises an insulated container having a dispensing opening in the bottom thereof. A vertical shaft extends into the container and is provided with an open-ended measuring cup adapted to pass over the dispensing opening once during each revolution of the shaft. The cup thus discharges a measured quantity of crushed ice through the opening once during each cycle of operation. Many novel and detailed features are incorporated in the apparatus and which will be described in greater detail later, but in general, they comprise a novel manner of mounting a stationary plate and a removable measuring cup on the apparatus so that the entire assembly may be readily removed from the container for service or for changing the size of measuring cup.

It is, therefore, an object of this invention to provide an ice storage and dispensing apparatus of relatively simple and economical construction but which is reliable and efficient in operation.

Another object is to provide a crushed ice dispenser wherein means are provided for varying the size of the charge of ice dispensed thereby.

Still another object of the invention is to provide a device of the type set forth wherein all of the operating mechanism is bodily removable from a container, as a unit, for service or adjustment.

A further object of the invention is to provide a device of the type set forth so constructed that water resulting from the melting of any ice in the container is drained therefrom and cannot be dispensed with a charge of crushed ice.

Other and additional objects and advantages will become apparent to those skilled in the art as the description proceeds with reference to the accompanying drawings wherein.

Figure 1:
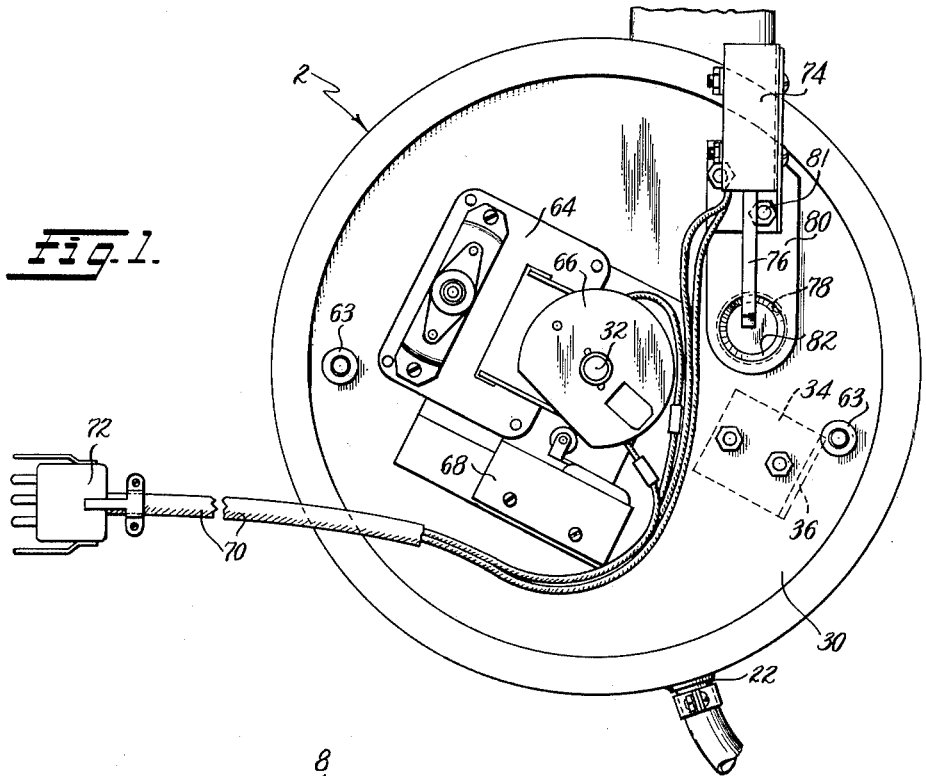
FIG. 1 is a top plan view of an apparatus embodying the present invention.
Figure 5:
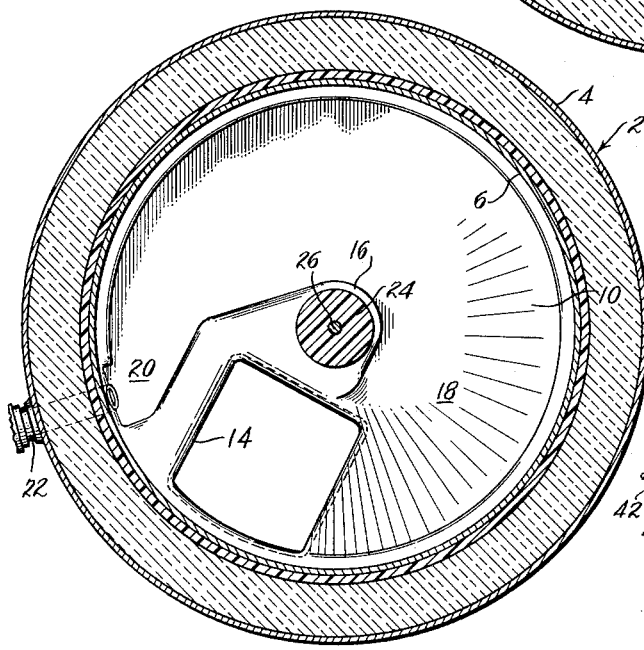
FIG. 5 is a horizontal sectional view taken along the line 5—5 of FIG. 2.

Referring to FIG. 1, a generally cylindrical container, shown generally at 2, comprises an outer shell 4, an inner shell 6, and a layer of thermal insulation 8 between the shells 4 and 6. The inner shell 6 is secured to a bottom wall 10 formed to define a downwardly extending spout, or the like, 12, constituting and bounding a discharge opening 14 through the bottom of the container. The bottom wall 10 is shown in plan view in FIG. 5 and, as shown therein, the opening 14 is located eccentrically of the center of the container and eccentrically of a drive shaft to be described later. The upper surface of the bottom wall 10 is configured so that the peripheral portion of the discharge opening 14 defines the highest level of the bottom wall. The bottom wall is further configured to define a central boss 16 and an annular surface portion 18 sloping from the level of the discharge opening 14 downwardly in a counter-clockwise direction and from the right-hand side of opening 14, as seen in FIG. 5, to a lowermost portion 20 adjacent the opposite or left-hand side of opening 14. A suitable drain fitting 22 is mounted in the bottom portion of the container 2 and communicates with the lowermost portion 20 of the bottom wall to drain therefrom any water resulting from melting of crushed ice stored in the container.

The central boss 16 supports a bushing member 24, which is secured to the container by means of bolt 26, or the like, and which bushing is provided with an opening 28 therein, which is open at its upper end.

Rotatedly journalled in a removable cover 30 is an upright, or vertical, shaft 32, the lowermost end of which is received in the opening 28 of bushing 24 whereby the lower end of shaft 32 is held against lateral movement and renders the shaft readily removable from the container, in an upward direction upon removal of cover 30.

A bracket 34 is secured to the under surface of the cover 30 and is provided with a downwardly extending portion 36 which extends downwardly into the container 2 along the inner surface of shell 12 and closely adjacent thereto. At its lower end, at a position spaced above the bottom wall 10, the bracket 34 is provided with a horizontal portion 38 to which a sector-shaped stationary plate 40 is secured. The sector-shaped plate 40 is provided with an opening through which shaft 32 extends rotatably and the plate 40 is dimensioned and positioned to overlie and completely cover the discharge opening 14.

Figure 7:
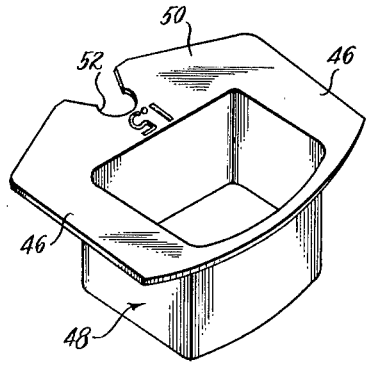
FIG. 7 is a perspective view of one of the measuring cups employed with the apparatus illustrated.
Figure 4:
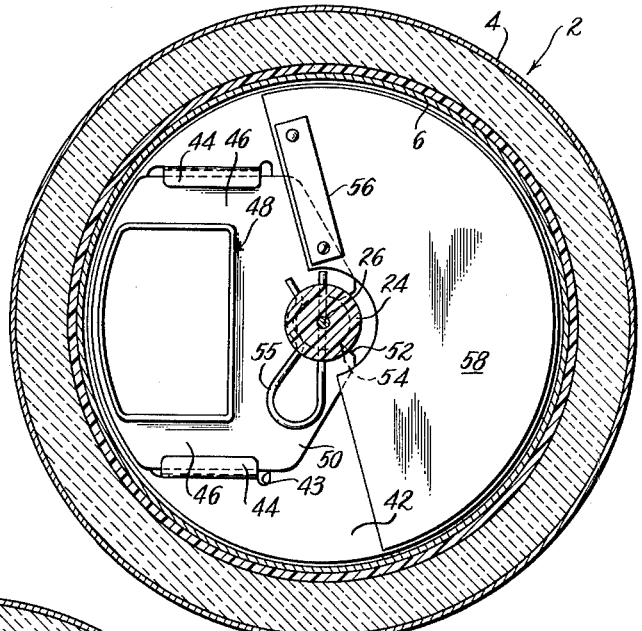
FIG. 4 is a horizontal sectional view taken along the line 4—4 of FIG. 2.
Figure 6:
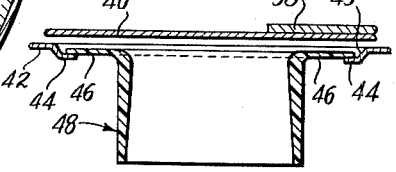
FIG. 6 is a fragmentary sectional view taken along the line 6—6 of FIG. 2.

Fixed to the shaft 32, immediately below the stationary plate 40, is a disc 42, having an opening 43 therethrough at a radial position corresponding to the eccentricity of the discharge opening 14. On opposite sides of the opening 43 through disc 42 the latter is provided with downwardly and inwardly extending parallel flanges 44 (see FIGS. 4 and 6), which slidably receive the edges of opposed flanges 46 (FIG. 7) of a removable measuring cup 48. The cup 48 is preferably formed of a suitable plastic material and is provided with the laterally extending flanges 46 on opposite sides thereof and a further flange 50 (see FIG. 7) at its inner edge. The measuring cup 48 is open-ended and its upper open end is held in registry with the opening 43 through disc 42. The rear flange 50 is provided with an undercut notch 52 adapted to be snapped about the shaft 32, or collar 54 thereon, to removably retain the measuring cup in position at the lower side of the disc 42. The collar 54 is fixed to disc 42 and serves to removably secure the same to shaft 32, by means of spring pin 55. For purposes of this description and the claims, collar 54 may be considered to be part of shaft 32.

As will be obvious, upon removal of the cover 30 and the mechanism carried thereby from the container 2, the measuring cup may be readily disengaged from the shaft 32 and removed by sliding outwardly along the flanges 44 and a different measuring cup of a different capacity may be installed in its place. As clearly shown in FIG. 6, the inner surface of the depending portions of measuring cup 48 diverge downwardly so as to minimize the possibility of a charge of crushed ice bridging and sticking in the measuring cup as it passes over discharge opening 14.

Figure 2:
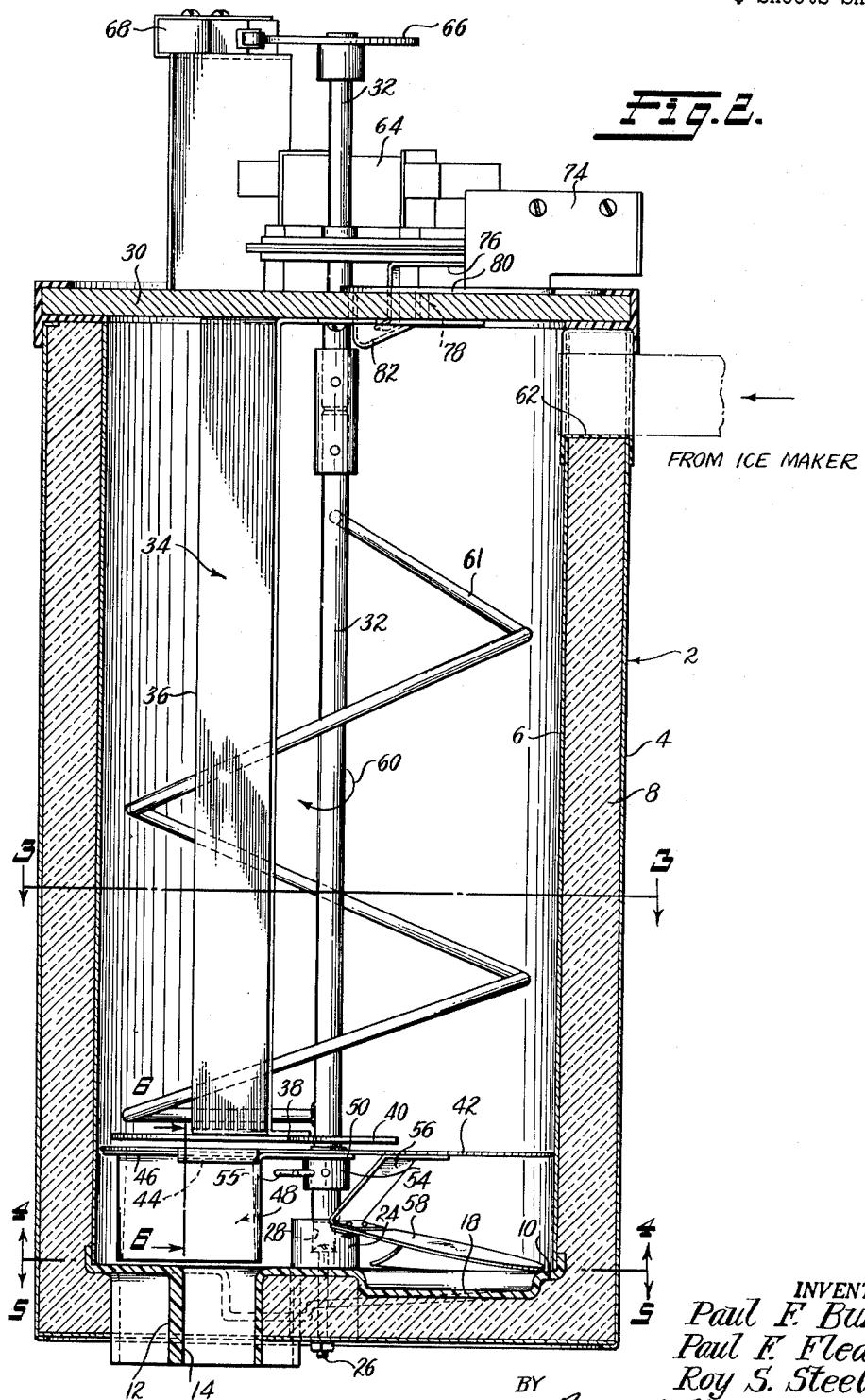
FIG. 2 is a vertical sectional view through the apparatus of FIG. 1.

Also secured to the under surface of the disc 42 is a bracket 56 to the lower end of which a solid but somewhat flexible generally semicircular sheet of material 58 is secured. The material 58 is preferably of a flexible plastic whereby it may be flexed under certain conditions. It is to be noted that the forward edge of the sheet 58 secured to bracket 56 extends generally upwardly and in a direction forwardly of the direction of rotation of the shaft 32 indicated by the arrow 60 in FIG. 2. It is to be further noted that the bracket 56 is mounted on disc 42 in trailing relation to the measuring cup 48.

A helical agitator 61 is secured to the shaft 32 and extends generally from the stationary plate 40 upwardly to a position adjacent the top of the container and serves to keep the crushed ice in a loose condition to insure its flowing by gravity to the bottom of container 12.

As is obvious from the drawings, the helical agitator 61 is spaced from but concentric to the shaft 32 and slopes upwardly in a direction rearwardly of the direction of rotation thereof with the shaft. Furthermore, the lower horizontal leg of the agitator extends radially of the shaft 32 and overlies and extends across the measuring cup 48. By this arrangement it is obvious that rotation of the agitator with the shaft tends to lift the crushed ice to keep it from packing or bridging and the horizontal portion extending over the cup 48 insures the breaking of any bridge that might tend to form thereof. This is a problem that is particularly pronounced when the product being dispensed is crushed ice.

At its upper end the side wall of container 2 is provided with an opening 62 through which crushed ice may be fed into the container from any suitable ice maker or other source.

As previously stated, the cover 30 is removable from container 2, being removably held in place by thumb nuts 63 (FIG. 1) or the like, and upon removal thereof all of the mechanism heretofore described is removed therewith as a unit.

Upon replacement of the cover on the container 2, the lowermost end of the shaft 32 is readily received in the upper portion of opening 28 whereby to center the lower end of the shaft and it is to be further noted that the lowermost end of the measuring cup 48 is in close proximity to the bottom wall 10 of the container.

Any suitable electric or other motor 64 (FIG. 1) may be employed to rotate shaft 32. The motor 64, as illustrated, is provided with a reduction gearing (not shown) driving the output shaft 32. At its upper end, above the motor 64, the output shaft 32 is provided with a cam 66 arranged to actuate a switch 68. A suitable power cord 70 supplies the motor 64 with electric power and is shown as being provided with a quick disconnect plug 72 for connection to a suitable electric power source.

It is contemplated that the motor 64 be energized for one cycle of operation upon actuation of an associated machine which dispenses a measured quantity of a beverage so that a charge of crushed ice will be dispensed and deposited in the beverage. For this purpose any suitable control means may be employed to energize the motor 64 whereupon it rotates to drive the shaft 32 through one complete revolution. After one complete revolution of shaft 32, the cam 66 actuates switch 68 to deenergize and stop the motor 64.

Also provided on the cover 30 is a control switch 74 provided with a feeler 76 extending through an opening 78 in the cover 30. A flexible plastic shield 80 is secured to the cover 30 by the same bolts 81 that secure switch 74 thereto and is provided with a cuplike portion 82, extending through the opening 78 and projecting into the interior of container 2. The feeler 76 projects downwardly into the cup portion 82. When the supply of ice in container 2 needs replenishing, ice is fed through the opening 62 until the container is full. When the container 2 is full of crushed ice, the same will build up to and engage cup 82 which is thereby deflected upwardly (since it is only secured to the cover 30 in the region of the switch 74) and also deflects the feeler 76 upwardly to actuate switch 74 to terminate the feeding of crushed ice into container 2.

Figure 3:
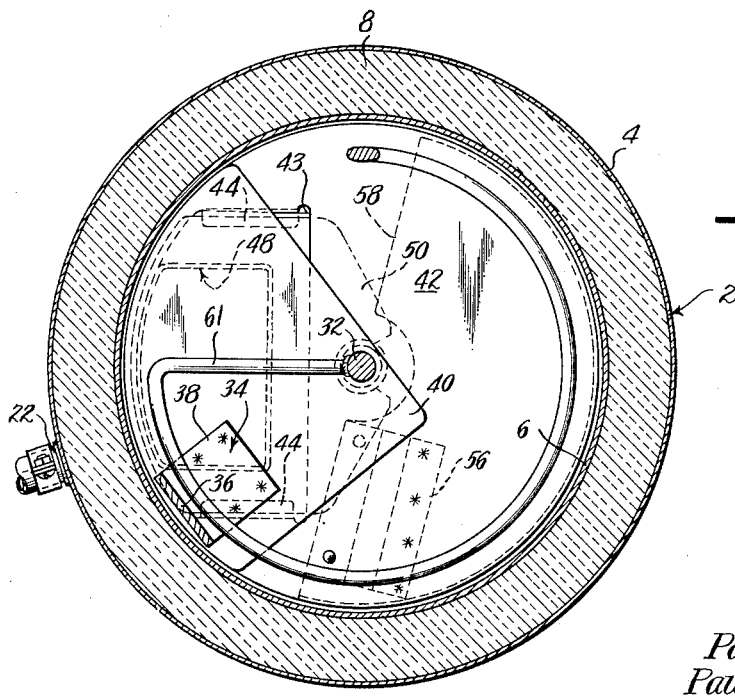
FIG. 3 is a horizontal sectional view taken along the line 3—3 of FIG. 2.

In operation, it is to be remembered that the shaft 32 is actuated through one complete revolution in a clockwise direction, as seen in FIGS. 1 and 3. During a portion of such rotation the open upper end of measuring cup 48 is in such position relative to stationary plate 40 that ice from container 2 may drop into and fill the same, the bottom of the charge resting slidably on the bottom wall 10. Continued rotation of shaft 32 carries the measuring cup 48 under stationary plate 40 wherein the cup is in registry with discharge opening 14 and the charge of ice in the cup drops through the opening 14 to be dispensed with a beverage. The stationary plate 40 thus serves to permit only the measured charge of ice to be dispensed and prevents additional crushed ice from entering the cup 48 when the latter is in registry of opening 14. The flexible sheet of material 58 secured to bracket 56 follows closely behind the cup 48 and passes over the discharge opening immediately thereafter. Since the leading edge of sheet 58 extends upwardly and forwardly, any ice still remaining on bottom wall 10 adjacent the opening 14 is pushed into the opening by the sheet 58, the latter also serving to break any "bridging" of ice at the entrance to discharge opening 14.

As will be apparent, the annular sloping portion of bottom wall 10 serves to drain any water in the container to the drain fitting 22 where the water may be led to suitable position of disposal. It is also to be noted that the cup 48 rotates in such direction that any ice therein resting on the sloping surface of bottom wall 10, is moved in a direction upwardly of that surface, that is, in the direction of rise whereby any water will drain from the ice in the direction rearwardly of its direction of motion. The sheet of material 58 overlies the discharge opening 14 during the major portion of the time when cup 48 is not in registry with that opening and the sheet 58 thus serves as an auxiliary closure for the opening 14 to prevent passage therethrough of any loose ice that might inadvertently find its way into the space below the disc 42.

While a single specific embodiment of the invention has been shown and described herein, it is to be understood that the same is merely illustrative of the principle of the invention and that other forms and modifications may be resorted to within the scope of the appended claims.

We claim:

1. In an ice dispensing device: a container; an upright driving shaft in said container; a discharge opening through the bottom wall of said container located eccentrically of the axis of said shaft; a stationary plate in said container, overlying said discharge opening, and spaced upwardly therefrom; a disc fixed to said shaft below and closely adjacent said stationary plate; said disc having an opening therethrough eccentrically of said shaft; an open-ended measuring cup removably mounted on the underside of said disc with its upper open end in registry with said opening therein; the lower open end of said cup being adjacent the bottom of said container and adapted to pass through registry with said discharge opening upon rotation of said shaft a removable cover on said container; said shaft being journalled in said cover; a bracket secured to said cover and extending downwardly in said container adjacent a side wall thereof; said stationary plate being secured to said bracket.

2. A device as defined in claim 1 wherein said measuring cup is provided with lateral flange means at its upper end; said flange means, on opposite sides thereof, being slidably supported by retaining means carried by said disk on opposite sides of the opening therein and guiding said cup for sliding movement toward and from said shaft; a portion of said flange means having a notch therein frictionally embracing said shaft to thereby releasably hold said cup on said disk.

3. In an ice dispensing device: a container, an upright driving shaft in said container; a discharge opening through the bottom wall of said container located eccentrically of the axis of said shaft; a stationary plate in said container, overlying said discharge opening, and spaced upwardly therefrom; an open-ended measuring cup mounted on said shaft below said stationary plate, the lower open end of said cup being adjacent the bottom of said container and adapted to pass through registry with said discharge opening upon rotation of said shaft; a closure plate carried by said shaft in trailing relation to said cup for substantially closing said discharge opening after said cup moves out of registry therewith, and resilient means biasing said closure plate into sliding contact with the bottom wall of said container.

4. In an ice dispensing device: a container having a bottom wall; an upright driving shaft in said container; a discharge opening through the bottom wall of said container at a position eccentric to said shaft; an open-ended measuring cup mounted on said shaft, the lower end of said cup being adjacent the bottom of said container and adapted to pass through registry with said discharge opening upon rotation of said shaft; said bottom wall having at least an annular portion thereof, concentric to said shaft, sloping from a highest level at a position adjacent one side of said discharge opening to a lowest level adjacent the other side of said discharge opening; a drain port through said container at said lowest level; and means for rotating said shaft in a direction to move said cup over said sloping portion to approach said discharge opening from said one side thereof.

References Cited in the file of this patent

UNITED STATES PATENTS

| | | |
|---|---|---|
| 480,146 | Souder | Aug. 2, 1892 |
| 2,193,235 | Jones et al. | Mar. 12, 1940 |
| 2,939,611 | Nebinger | June 7, 1960 |
| 2,975,937 | Totten | Mar. 21, 1961 |
| 3,067,591 | Lingle | Dec. 11, 1962 |
| 3,075,363 | Conto | Jan. 29, 1963 |